United States Patent [19]
Luchaco
[11] 3,736,444
[45] May 29, 1973

[54] A CIRCUIT FOR CONTROLLABLY DRIVING A SCHMITT TRIGGER IN RESPONSE TO PRESELECTED VARIATIONS IN AN ANALOG INPUT SIGNAL AND IN A DIGITALIZED INPUT SIGNAL

[75] Inventor: David G. Luchaco, Horseheads, N.Y.

[73] Assignee: The Bendix Corporation, Southfield, Mich.

[22] Filed: Oct. 29, 1971

[21] Appl. No.: 193,824

Related U.S. Application Data

[62] Division of Ser. No. 183,907, Sept. 27, 1971.

[52] U.S. Cl. ...............307/290, 307/235, 307/252 F, 307/264

[51] Int. Cl. ...............H03k 3/26

[58] Field of Search ...............307/290, 235, 264; 328/150, 151

[56] References Cited

UNITED STATES PATENTS

| | | | |
|---|---|---|---|
| 3,018,386 | 1/1962 | Chase | 307/290 X |
| 3,151,256 | 9/1964 | Simon et al. | 307/290 X |
| 3,344,319 | 9/1967 | Schimsky | 307/290 X |
| 3,336,485 | 8/1967 | Scarpa | 307/290 X |
| 3,603,906 | 9/1971 | Naylor | 307/290 X |

*Primary Examiner*—Stanley D. Miller, Jr.
*Attorney*—Robert A. Benziger, William S. Thompson John S. Bell

[57] ABSTRACT

A circuit is disclosed for controllably driving a Schmitt trigger in response to variations in both an analog and a digitalized input signal. A Schmitt trigger normally comprises a pair of electronic devices, each of the devices having a control electrode. The circuit of the present invention applies the analog signal to one of the control electrodes and applies the digitalized signal to the other of the control electrodes. The control electrodes of the Schmitt trigger are biased by voltage divider means so that the electronic device whose electrode is receiving the analog signal is normally in the nonconducting or "off" condition while the electronic device receiving the digitalized information is normally in the conducting or "on" condition. A portion of the digitalized signal is derived by suitable switching means from the input analog signal.

5 Claims, 1 Drawing Figure

Patented May 29, 1973 3,736,444
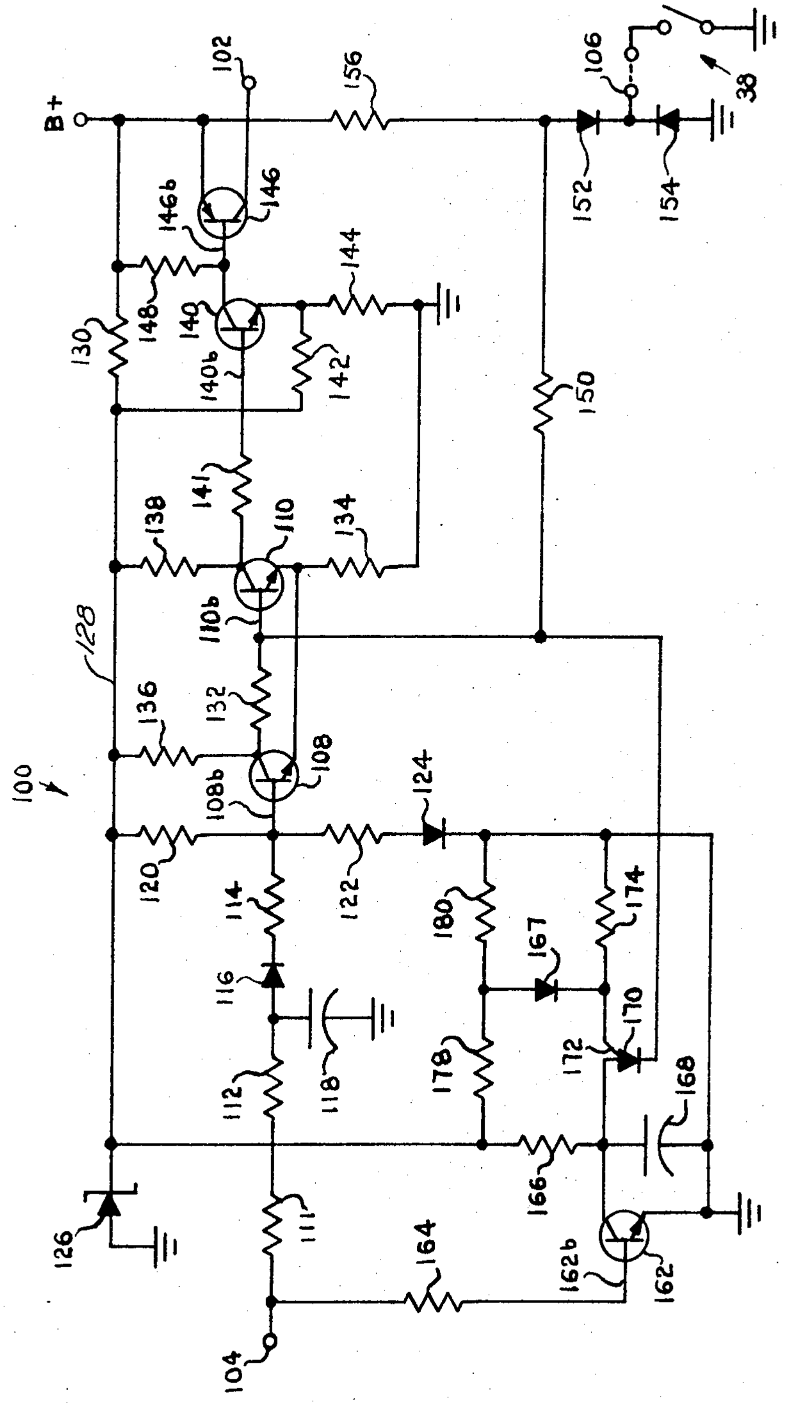
DAVID G. LUCHACO
*INVENTOR.*
BY Robert A. Benziger

CIRCUIT FOR CONTROLLABLY DRIVING A SCHMITT TRIGGER IN RESPONSE TO PRESELECTED VARIATIONS IN AN ANALOG INPUT SIGNAL AND IN A DIGITALIZED INPUT SIGNAL

CROSS REFERENCE TO RELATED APPLICATION

This application is a division of my commonly assigned Patent application Ser. No. 183,907 "Fuel Cutoff Circuit Responsive to Engine Deceleration Conditions for use in Conjunction with the Fuel Delivery System for an Internal Combustion Engine," filed Sept. 27, 1971.

BACKGROUND OF THE INVENTION

1. Field of the Invention

The present invention relates to the field of electronic control circuits used to control the output condition of a further electronic circuit. In particular, the present invention is related to the field of electronic control circuits for controlling the condition of a Schmitt trigger to produce a desired, usable output.

2. Summary of the Prior Art.

Schmitt triggers are well known in the art and are generally used to convert a time varying, or analog, voltage signal into a digitalized output signal whose transitions correspond to the excursions of the input analog signal through a selected voltage level. It is also known to provide feedback between the Schmitt trigger output and the Schmitt trigger input so that alternative transitions of the output signal correspond to excursions of the analog signal through different voltage levels. It is also known to condition the occurrence of the digitalized Schmitt trigger output signal upon the occurrence of a digitalized input signal by using that input signal to complete, or terminate, the communication of the analog signal to the input of the Schmitt trigger. Such an embodiment is illustrated in U.S. Pat. No. 3,570,460, issued Mar. 16, 1971, in the name of Freidrich Rabus. Such an arrangement is known to present difficulty in balancing the various voltage levels which must be present at the various circuit points which control the output of the Schmitt trigger. This is particularly true in those situations where it is desired to have alternate transitions of the Schmitt trigger output signal occur at differing levels of received analog signals. It is therefore an object of the present invention to provide a driving circuit for a Schmitt trigger which is capable of readily receiving and processing both an analog signal and a digital, or digitalized, signal to conditionally control the output signal of the Schmitt trigger. It is a more particular object of the present invention to provide a Schmitt trigger driving circuit of the above-described character which does not rely upon a digitalized signal to complete the communication between the analog signal and the Schmitt trigger.

A further problem with the Schmitt trigger driving circuits as illustrated in the above-noted U.S. Patent resides in the fact that such circuits are frequently used when a first Schmitt trigger output signal transition is intended to occur in response to the coincidence of a pair of selected variations in an analog and digital signal, but the next following transition is intended to occur as the result of alternative conditions in either the analog signal or the digital signal. This renders the circuit designers job most difficult and time consuming since the adjustment of the various voltage levels among a large number of interrelated electrical and electronic devices requires a large number of reiterative steps. It is therefore a still further object of the present invention to provide a driving circuit for a Schmitt trigger in which the various input control signals may be applied to different circuit locations. In particular, it is a still further object of the present invention to provide a Schmitt trigger driving circuit which utilizes the control electrodes of both electronic devices of the Schmitt trigger circuit as input locations. It is a still further object of the present invention to provide such a driving circuit in which adjustment of the various voltage level establishing means may be accomplished without affecting the voltage levels established by other voltage level establishing means. It is a still further object of the present invention to provide a Schmitt trigger driving circuit which does not rely upon feedback to alter the Schmitt trigger response levels. In particular, it is a specific object of the present invention to provide a Schmitt trigger driving circuit which generates an analog signal to control one Schmitt trigger transition and which digitalizes that signal to control the other Schmitt trigger output signal transition.

BRIEF DESCRIPTION OF THE DRAWING

The single FIGURE of the drawing shows, in diagrammatic circuit form, the circuit of the present invention for controllably driving a Schmitt trigger.

DETAILED DESCRIPTION OF THE PREFERRED EMBODIMENT

Referring now to the drawing, a circuit 100 is shown utilizing the Schmitt trigger of the present invention. The circuit 100 is energized by B+ as noted, and this may readily be any convenient source of substantially constant value voltage. By "substantially constant value voltage" is meant a d.c. voltage whose variations do not exceed ± 100 percent. Circuit 100 has an output port 102 and two input ports denoted as 104 and 106. In this embodiment, circuit port 104 is communicated to base or first control electrode **108*b* of transistor 108 by resistive circuit means which include resistances 111, 112, and 114, diode 116 and integrating capacitor 118. The base 108*b* of transistor 108 is communicated to a source of voltage by resistance 120 and is also communicated to ground by resistance 122 and diode 124. In this embodiment, the resistance 120 is connected to a source of regulated voltage illustrated as zener diode 126 which is operative to establish a regulated voltage within common conductor 128 which communicates the cathode of the zener diode 126 to resistance 130, which in turn is connected to the supply B+ as shown. The collector of transistor 108 is coupled to the base 110*b* of transistor 110 through resistance 132 and the emitters of transistors 108 and 110 are coupled together and coupled to ground by resistance 134. The collector of transistor 108 is connected to the common connector 128 by resistance 136, and the collector of transistor 110 is connected to the common conductor 128 by resistance 138. The collector of transistor 110 is also coupled to the base 140*b* of transistor 140 through resistance 141. Transistors 108 and 110, together with their respective load and limit resistances, form a Schmitt trigger and the resistive values are such that the Schmitt trigger will normally be biased with transistor 108 in the "off" or nonconducting mode and transistor 110 in the "on" or conducting mode. The emitter of transistor 140 is connected by resistance 142 to the common conductor 128 and by resistance 144 to the ground location. Resistances 142, 144 form a voltage divider network to establish a bias voltage at the emitter of transistor 140. The collector of transistor 140 is directly coupled to the base 146*b* of transistor 146 and to the source of energization, B+,by resistance 148. While all other transistors in circuit 100 are illustrated as npn transistors, transistor 146 is shown as a pnp transistor with its emitter electrode connected to the source of energization, B+ and its collector electrode connected to the output port 102 of the circuit 100.** It should be noted, however, that transistor types herein are merely a matter of designer's choice.

Base or control electrode 110b of transistor 110 is connected by way of resistance 150 and diode 152 to output port 106 which is also coupled to ground by diode 154. Diode 152 is connected so that its cathode is coupled to the output port 106 and its anode, while coupled to resistance 150, is coupled to the B+ supply by way of resistance 156. Thus, in the absence of a low voltage signal at output port 106 which would forward bias diode 152, resistances 136, 132, 150, and 156 form a voltage divider network operative to establish the voltage at the base of transistor 110 at some value intermediate the B+ supply voltage and the regulated voltage existing in common conductor 128. By suitably arranging the resistive values, the Schmitt trigger can be so biased that transistor 110 is well into saturation and therefore normally in conduction as hereinbefore stated. Circuit output port 106 may be coupled to remotely actuable switch 38. The circuit as hereinabove described is adapted to operate when actuation of switch 38 applies a ground or low voltage signal to circuit port 106 to forward bias diode 152. Diode 154 as illustrated is operative to provide contact arcing protection. Switch 38 is intended to illustrate any suitable means of generating a digitalized signal and may be automatically, manually, or otherwise operated.

Input port 104 is also coupled to the base **162*b* of transistor 162 by resistance 164. The collector of transistor 162 is coupled to the common conductor 128 by resistance 166 and interval determining means in the form of capacitor 168 are connected from the collector of transistor 162 to the ground point. The emitter of transistor 162 is also connected to ground so that interval determining means 168 are connected across the emitter and collector of transistor 162. The collector of transistor 162 is also connected to the anode of a bistable switch 170 having a control electrode 172. The cathode of the switch is connected to the base 110*b* of transistor 110. The control electrode 172 is coupled to the ground potential by a resistance 174 and by diode 176 to a voltage divider comprised of resistances 178 and 180. Resistances 178 and 180 interconnect the common conductor 128 with the ground point and are operative to apply a predetermined level of voltage to the gate or control electrode 172 while resistance 174 is operative to provide a current flow path to ground for current flow from the control electrode 172. Bistable switch 170 is herein illustrated as a programmable unijunction transistor (PUT). Such a device is operative to switch from a nonconducting to a conducting state whenever the voltage applied to the anode thereof exceeds the voltage applied to the control electrode by the voltage drop across one pn junction (typically, seven-tenths of a volt). Once conducting, such devices will remain conducting for any value of voltage applied to the gate, or anode, until the current flow through the device has dropped to a very low level. Bistable switching device 170 may also be a silicon controlled rectifier (SCR), and such devices are known to operate in substantially the same fashion as a PUT in this type of embodiment. Furthermore, other devices of this general character may be utilized for bistable switching device 170.**

OPERATION

Upon the application of an energizing supply, B+, as for instance by way of an external switch, regulating zener diode 126 will operate to establish a regulated voltage in common conductor 128. Since this voltage will be lower than the B+ voltage, a current will flow through resistance 156, resistance 150, resistance 132, and resistance 136, establishing a voltage at base **110*b* of transistor 110 which is intermediate the regulated voltage and the B+ supply voltage. By suitably sizing the resistors as hereinbefore stated, this voltage, relative to the voltage established at base 108*b* of transistor 108 by voltage divider resistances 120, 122 and diode 124, can be sufficient to cause transistor 110 to go into conduction thereby holding transistor 108 off. By suitably arranging the resistances 138 and 134, the voltage at the emitters of transistors 108 and 110 can be established intermediate the regulated voltage and the ground level, and by suitably arranging the resistances 120 and 122 the voltage present at the base 108*b* will be less than the voltage at the emitters. This will then reverse bias the emitter base junction of transistor 108 and this transistor will be held off. Assuming normal operation of the means generating the analog signal over the expected range of operation and further assuming that input port 104 does not receive a ground signal, transistor 108 will be held off and transistor 110 will be held on so that no base current may flow into base 140*b* of transistor 140, thereby causing this transistor to be off which in turn will hold transistor 146 off. Upon closure of switch 38, input terminal 106 will be grounded and will thus cause the current flow through resistances 136, 132, and 150 to reverse in direction. This will cause the voltage applied to the base of transistor 110** to drop to a value which is merely sufficient to maintain conduction thereof.

Normal operation of the means generating the analog signal will cause, in this instance, a sequence of pulses to appear to terminal 104 of the circuit, which pulses may have a fixed or variable duration and a repetition rate which is the analog of the parameter selected for examination. The pulses received at terminal 104 of circuit 100 will be applied to the integrating capacitor network comprised of resistance 112 and capacitor 118, and the capacitor discharge network which includes diode 116, resistance 114, resistance 122, and diode 124 going to ground. As the repetition rate of these pulses increases, the average voltage appearing at the anode of diode 116 will increase so that the voltage level is substantially directly indicative of the examined parameter. By suitably sizing the capacitor this network may be arranged so that the voltage appearing at the base **108*b* of transistor 108 will be sufficiently high to drive that transistor into conduction when the examined parameter is above a preselected value and switch 38 is closed. Resistance 132 will cause conduction of transistor 108 to provide a lower impedance path to ground for current flowing through resistance 136, thereby terminating base current flow into the base 110***b* of transistor 110. This will rapidly switch transistor 110 off thereby causing the voltage on the collector of transistor 110 to rise and thereby applying an increased voltage to base 140*b* of transistor 140. This will cause transistor 140 to go into conduction so that a current will flow through resistance 148, thereby applying a voltage drop in the forward direction across the emitter-base junction of transistor 146. This will cause transistor 146 to go into conduction and thereby apply a high voltage signal at output terminal 102.

An opening of switch 38 operative to terminate the ground signal at port 106 during a cycle will cause a base current to flow into base 110*b* by way of resistances 156 and 150. The provision of this base current will cause transistor 110 to switch back on again, and by the intercoupling of emitters will concomitantly cause transistor 108 to rapidly switch off. This will terminate the provision of a high voltage output signal at terminal 102. Thus, the Schmitt trigger signal may be terminated by an opening of switch 38 at any time during a cycle. The present invention therefore causes a transition of the Schmitt trigger output signal only when the analog signal reaches a preselected value and the digital signal (from switch 38) is in a preselected state.

The receipt of the pulses at terminal 104 will be further operative to periodically cause transistor 162 to go into conduction due to the receipt of a high voltage signal through resistance 164 at base 162*b*. Transistor 162 will be in conduction for a time period which substantially corresponds, within the limits of solid state electronic device switching times, to the width of the pulse. When transistor 162 is nonconducting (i.e., during interpulse intervals), the regulated voltage from the common conductor 128 will be applied through resistance 166 to capacitor 168. The capacitor 168 will therefore charge to a value which is directly related to the interpulse interval and hence to the examined parameter. The periodic switching on of transistor 162 will be operative to provide a voltage discharge path to ground for capacitor 168 and by suitably sizing this capacitor, it can be arranged to be fully discharged during the pulse width duration. Furthermore, by suitably sizing the resistance 166 the RC time constant of this resistance 166 and capacitor 168 can be arranged to be relatively long compared with the discharge time so that the charge-up time of the capacitor is of a comparatively long duration. Thus, when the interpulse interval is comparatively short, as, for instance, when the examined parameter is small, the capacitor will be periodically charged up to a low value. However, when the examined parameter is large, the voltage across capacitor 168 and hence the voltage applied to the anode of bistable switching device 170 will be high. Resistances 178, 174, 180, and diode 176 form a voltage divider network which establishes a fixed level of voltage at gate electrode 172. It can therefore readily be arranged that, when the examined parameter reaches a predetermined value, the voltage accumulated across capacitor 168 will be sufficiently high (one diode drop above the voltage applied to gate 172) so that bistable switching device 170 goes into conduction. Once conducting, the current flowing therethrough will be applied to the base of 110*b* of transistor 110 to cause that transistor to go into conduction. Conduction of that transistor will cause the termination of conduction of transistor 140, the termination of conduction of transistor 146, and the termination of the fuel cutoff signal at output terminal 102. Thus, the present invention provides a Schmitt trigger driving circuit which can examine an analog and a digitalized input signal and which can provide a plurality of varying conditions to control the transitions of the Schmitt trigger output signal.

The use of means to digitalize the analog signal to generate information for controlling the transition of the Schmitt trigger to be controlled by the alternative conditions is intended to illustrate circuitry as an alternative to that illustrated by the integrating circuitry, either of which may interface between the source of analog signal which is received at circuit input port 104 and that portion of the Schmitt trigger intended to receive the signal to control the alternate transition levels. Thus, the first transistor 110 controls one transition of the Schmitt trigger output while the second transistor 108 controls the preceding transition and the succeeding transition when permitted by the appropriate digitalized signal from switch 38.

I claim:

1. A circuit for controllably driving a Schmitt trigger having first and second transistors, each transistor having a control electrode, to generate a conditioned digital output signal in response to preselected variations in a continuously received analog signal and in a first digital occurrence of mutual preselected variations in the analog and first digital signals and the other transition of the digital output signal conditioned upon the occurrence of a single preselected variation in either the analog signal or the first digital signal, comprising:

voltage divider means coupled to the control electrodes of the transistors operative to apply voltage signals thereto of sufficient magnitudes whereby the second transistor will be conducting and the first transistor will be nonconducting and the Schmitt trigger will generate an output signal of a first level;

input circuit means operative to apply the analog signal to the control electrode of the first transistor; and first switching means coupled to the control electrode of the second transistor operative when closed to substantially prevent current flow through said control electrode;

said voltage divider means cooperative with said first switching means to maintain the second transistor conducting and the first transistor nonconducting whenever said first switching means are open;

said input circuit means and said first switching means cooperative to cause the first transistor to be conducting and to permit the second transistor to be nonconducting when said switching means are closed and the analog signal exhibits a first preselected variation.

2. The circuit as claimed in claim 1 wherein said voltage divider means comprise:

first voltage divider means connected to the second transistor control electrode operative to apply a relatively large voltage thereto whereby the second transistor will be driven well into saturation; and second voltage divider means connected to the first transistor control electrode operative to apply a relatively small voltage thereto, the second voltage divider means voltage having a value which is sufficient to maintain the first transistor in a conducting mode but which is insufficient to switch the first transistor into conduction.

3. The circuit as claimed in claim 2 wherein said first switching means comprise means forming a low impedance circuit path between the second transistor control electrode and ground and including a normally open first switch member normally maintaining said low impedance circuit path open and closable to complete said circuit path.

4. The circuit as claimed in claim 2 including further second switching means interconnecting said input circuit means and the second transistor control electrode operative to provide an alternative current flow path for current flow through the second transistor control electrode.

5. The circuit as claimed in claim 4 wherein said second switching means comprise means providing a current flow path connected to the second transistor control electrode and including a second normally open bistable switch member responsive to the analog signal operative to switch from the open state to the closed state when the analog signal exhibits a second preselected variation.

* * * * *